INVENTOR:
LAWRENCE AU

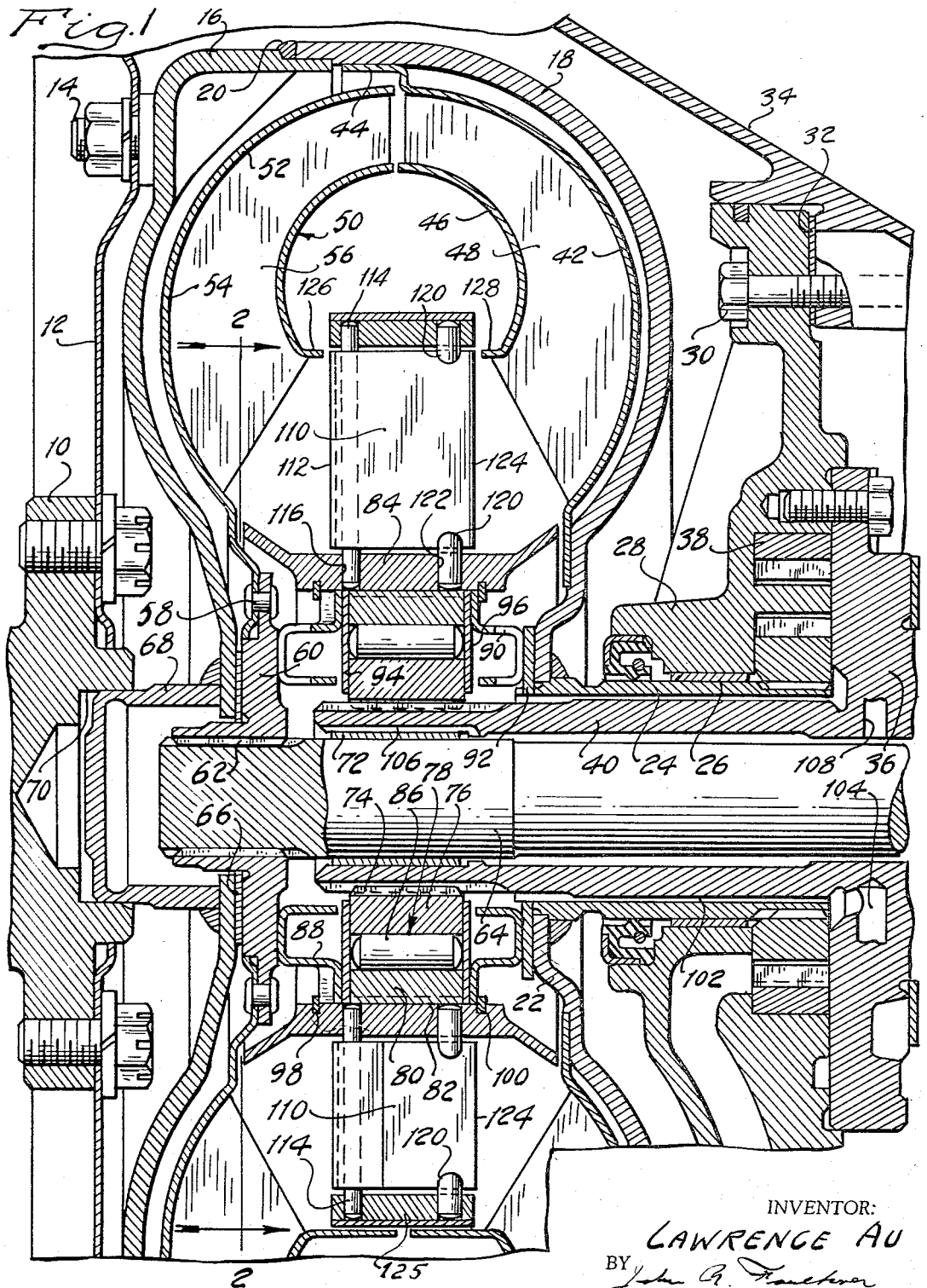

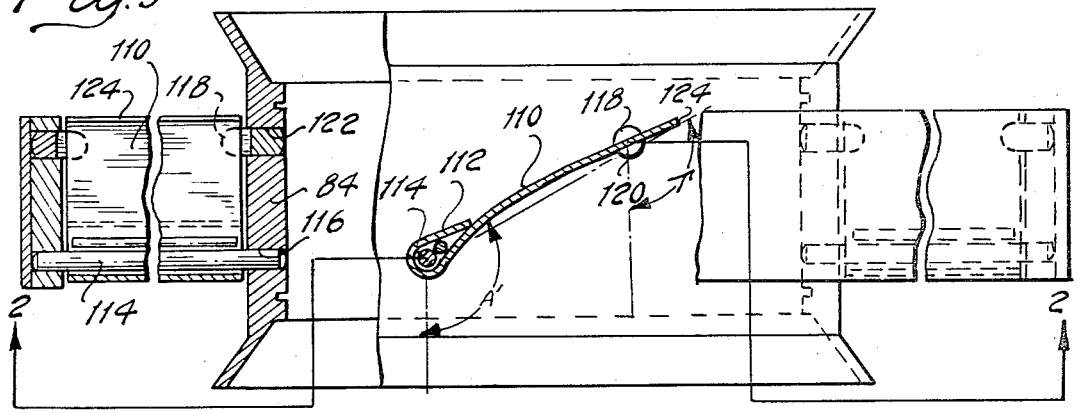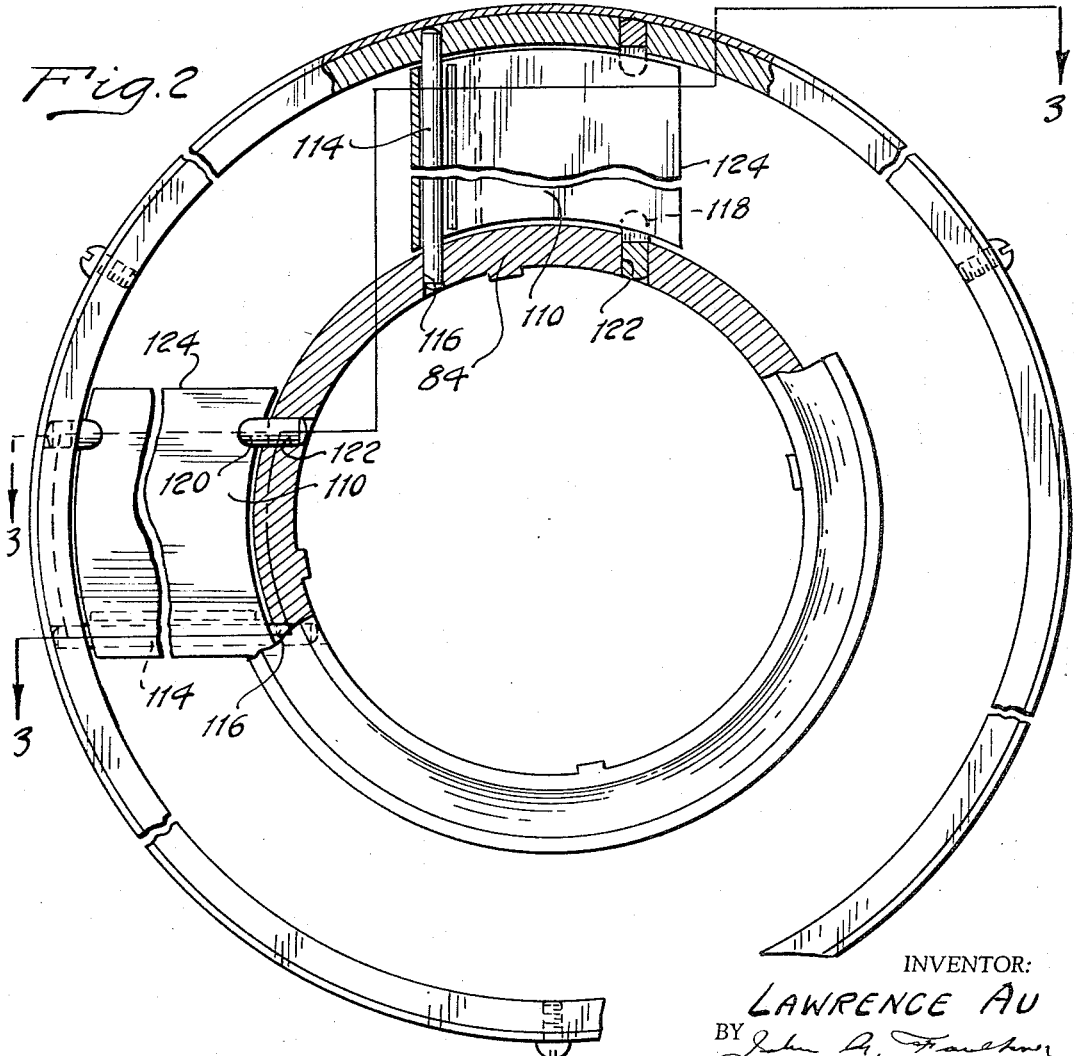

# United States Patent Office 3,370,425
Patented Feb. 27, 1968

3,370,425
HYDROKINETIC TORQUE CONVERTER MECHANISM HAVING A STATOR WITH BLADES OF VARIABLE GEOMETRY
Lawrence Au, Livonia, Mich., assignor to Ford Motor Company, Dearborn, Mich., a corporation of Delaware
Filed Aug. 1, 1966, Ser. No. 569,216
6 Claims. (Cl. 60—54)

ABSTRACT OF THE DISCLOSURE

This specification describes a hydrokinetic torque converter having a bladed impeller, a bladed stator and a bladed turbine. The stator has blades of variable geometry. Each stator blade includes a pivot pin at its leading edge and an anchor pin adjacent its trailing edge. The span of the blade between the anchor pin and the pivot pin deflects under the influence of hydrodynamic forces caused by the toroidal fluid flow in the torque converter circuit. Flexure of the blades results in optimum blade geometry for both high torque ratio driving conditions and for operation of the converter at speed ratio approaching the coupling condition.

My invention relates generally to hydrokinetic torque converter mechanisms for use in automotive vehicle drivelines. It relates more particularly to improvements in a hydrokinetic torque converter mechanism capable of providing an extended range of speed ratios over which a useful torque multiplication ratio can be obtained.

During operation of a hydrokinetic torque converter the fluid circulates in a toroidal fluid flow pattern through the torus circuit as energy is imparted to the fluid by the bladed impeller. The tangential component of the absolute flow velocity vector for the fluid passing through the bladed passages of the turbine is caused to change as the flow passes from the entrance region of the turbine to the turbine flow exit region. This change, in addition to the decreasing operating radius of a particle of fluid that traverses the bladed passages of the turbine, results in a decrease in the moment of momentum of the fluid as turbine torque is developed. The blades of the stator function to redirect the fluid flow passing from the flow exit section of the turbine so that the angularity of the fluid flow vectors at that region of the circuit will tend to become aligned with the blades at the flow entrance region of the impeller. In this way a torque augmentation is obtained.

During operation at zero speed ratio (i.e., when the turbine is stalled), the absolute fluid flow velocity vector at the flow exit region of the turbine enters the flow entrance region of the stator at an angle that is relatively oblique with respect to the mean camber line of the blades of the stator. The direction of the flow velocity vector at this region of the circuit changes rather significantly, however, as the converter speed ratio increases. At some intermediate value for the speed ratio, the absolute flow velocity vector at the entrance region of the stator blades becomes aligned with the entrance angle for the stator blading. Upon a further increase in the speed ratio to a value that is near the converter coupling point, the absolute flow velocity vector at the entrance region of the stator again becomes misaligned, but in the opposite sense with respect to the low speed ratio mode of operation.

In certain hydrokinetic torque converter mechanisms of known construction, provision is made for adjustably mounting the stator blades within the stator assembly so that the effective flow exit angle of the stator can be changed to provide either a high torque ratio condition at relatively low speed ratios or a relatively high efficiency operating condition at high speed ratios. In this way the angularity of the flow vectors at the entrance region of the impeller can be matched more effectively with the blade geometry for the entrance section of the impeller blades during low speed ratio operation to provide increased torque ratio augmentation. This stator blade angularity is unfavorable, however, for high efficiency cruising performance. For this reason the blades can be adjusted in prior art constructions to a second operating position that will contribute to a high efficiency operation in the higher speed ratios as the flow velocity vector at the entrance region of the impeller tends to become aligned to a greater degree with the impeller blade entrance geometry at high speed ratios.

These prior art arrangements have an inherent shortcoming in that the adjustment of the flow exit geometry of the stator blades causes an unfavorable flow entrance condition for the stator blades. This results from a misalignment of the absolute fluid flow velocity vectors at the exit region of the turbine blading with respect to the entrance section of the stator blades when the latter are adjusted to the high performance low speed ratio operating position. In an attempt to overcome this shortcoming, it is a common practice to provide the stator blades with a relatively blunt, round nose section that will tend to offset partially the adverse effect of the misalignment of the flow entrance geometry of the stator blading and the absolute fluid flow velocity vector at the turbine exit. Another shortcoming in prior art systems of this type is their inability to assume any position other than the two operating positions described in the foregoing paragraphs. For example, the blading is designed to assume either a high performance operating position as the blades are rotated in one direction during start-up or a high efficiency operating condition as the blades are rotated in the opposite direction when the converter approaches the converter coupling point. If the converter assumes a speed ratio intermediate the low speed ratio design point and the high speed ratio design point, the stator flow condition that is assumed must be a compromise between the flow conditions that are assumed when the speed ratio corresponds to each of the two design points.

It is an object of my invention to provide a hydrokinetic torque converter mechanism having adjustable stator blading wherein the geometry of the blading can be varied progressively as the speed ratio changes from a low speed ratio value to a high speed ratio value, thereby providing a relatively optimum flow geometry for the stator blades throughout the entire speed ratio range.

It is a further object of my invention to provide a hydrokinetic torque converter having adjustable flow directing stator blading wherein provision is made for simultaneously adjusting the flow exit blade geometry for the stator simultaneously with the adjustment of the flow entrance blade geometry so that an optimum flow entrance condition is achieved at both the entrance section and the exit section of the fluid flow passages designed by the stator blades.

It is a further object of my invention to provide a hydrokinetic torque converter mechanism having stator blading that is flexible throughout its entire extent thereby providing geometry variations in the blading that are dependent upon the velocity of the fluid in the passages of the stator.

It is another object of my invention to provide hydrokinetic torque converter stator blading that can be flexed under the influence of hydrokinetic forces of the fluid passing through the bladed passages of the stator.

It is a further object of my invention to provide a stator for a hydrokinetic unit of the type above set forth wherein the entrance section of the stator blade and the trailing edge section of the stator blade both are anchored so that they are held fast with respect to axes which extend generally radially with respect to the axis of the converter.

Further objects and features of my invention will become apparent from the following description and from the accompanying drawings wherein:

FIGURE 1 shows in longitudinal cross-sectional form a hydrokinetic torque converter embodying the improvements of my invention;

FIGURE 2 shows a partial assembly view of the stator blades as viewed from the plane of section line 2—2 of FIGURE 1;

FIGURE 3 is a view of the stator of FIGURE 2 as seen from the plane of section line 3—3 of FIGURE 2.

Figure 4A:
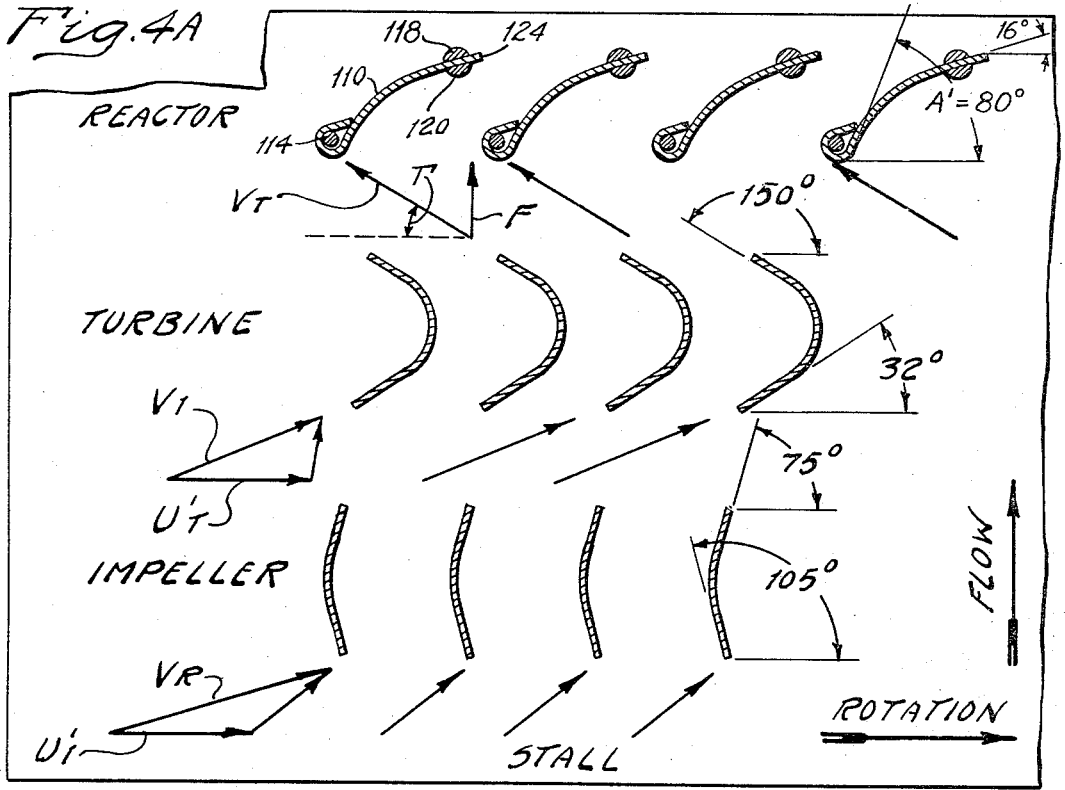
FIGURES 4a, 4b, 4c and 4d show in diagrammatic form the fluid flow velocity vectors for a particle of fluid as it traverses the toroidal fluid flow circuit of the converter.

In FIGURE 1 numeral 10 designates the flange end of the crankshaft of an internal combustion engine in an automotive vehicle driveline. It is bolted to a driveplate 12, which in turn is secured by bolts 14 to the periphery of an impeller shell part 16. The part 16 is secured to an impeller shell part 18 by a peripheral weld 20.

The shell part 18 is formed in the shape of a semi-torus and it cooperates with the shell part 16 to define a closed impeller shell cavity.

The hub 22 of the shell part 18 is welded or otherwise secured to a center support sleeve 24. This in turn is journalled by means of a bushing 26 within a cooperating opening formed in a transverse support wall 28. Bolts 30 secure wall 28 to an internal shoulder 32 formed on the transmission housing 34.

Secured to the wall 28 is a pump closure plate 36 which cooperates with a cavity 38 formed in the wall 28 to define a pump chamber. Positive displacement pump elements are located in the chamber, as indicated. These are drivably connected to the shaft 24.

A relatively stationary stator sleeve shaft 40 formed on the closure member 36 extends concentrically with respect to the shaft 24.

An outer impeller shroud 42 of generally semi-toroidal shape is secured at its periphery 44 to the inner surface of the shell part 18 at a radially outward location. The radially inward extremity of the shroud 42 is secured to the inner face of the hub 22 for the shell part 18. An inner impeller shroud 46 cooperates with the shroud 42 to define radial outflow passages. Impeller blades 48 are located in the passages of the impeller.

The impeller flow passages are in fluid communication with radial inflow passages defined by a turbine 50. The turbine includes an outer turbine shroud 52, an inner turbine shroud 54 and turbine blades 56 situated between the shrouds 52 and 54. The radially inward margin of the shroud 52 is secured by rivets 58 to a hub 60, which in turn is splined at 62 to turbine shaft 64. A thrust washer 66 is situated between the hub 60 and the central portion of the shell part 16. A pilot member 68, which is welded to the central portion, is received within a pilot opening 70 formed in the crankshaft end 10.

The shaft 64 is journalled by means of a bushing 72 within the stationary stator sleeve shaft 40. This shaft is splined at 74 to the inner race 76 of an overrunning brake 78. The brake 78 includes a cammed outer race 80, which is received within the central opening 82 formed in the stator hub 84 where it is formed with cam surfaces. Overrunning brake rollers 86 register with the cam surfaces to inhibit rotation of the stator in the direction of rotation of the impeller. The inner race 80 can be keyed or splined within the opening 82.

A spacer 88 is located in the opening 82 on the left-hand side of the races 76 and 80. It acts as a thrust member as it maintains the races 80 and 76 in proper axial position. A second spacer 90 is situated on the right-hand side of the races 80 and 76. A thrust washer 92 is located between the spacer 90 and the hub 22 of the shell part 18.

Roller retainer rings 94 and 96 are located on either side of the races 80 and 76 and are held in place by the adjacent spacers. The entire brake assembly is held axially fast by snap rings 98 and 100.

Fluid is delivered to the torus circuit of the converter through an annular feed passage defined by the concentric sleeve shafts 24 and 40. This passage communicates with a converter feed passage 104 formed in the member 36. This passage 104 forms a part of a control valve system not shown. The pump shown in part at 38 acts as a pressure source for the valve system.

The fluid that is distributed to the passage 102 passes radially outwardly through the spacer member 90 and then enters the toroidal fluid-flow circuit of the converter. Fluid is returned from the converter in a radially inward direction directed through the flow path defined in part by apertures formed in the spacer member 88. Communicating with these are axially directed grooves 106 which communicate with the annular flow passage defined by the concentric shafts 64 and 40. A flow return passage 108 communicates with this annular passage.

In FIGURE 2 and in FIGURE 3 I have illustrated the stator blade construction. The stator blades comprise flexible steel elements 110 which are formed with a rounded nose portion 112. This nose portion of each blade element 110 is formed by wrapping the leading edge of the blade element around a pivot pin 114. This produces an effective reactor blade element entrance angle A'. Each pin 114 is received within an opening 116 formed in the hub 84.

The trailing edge portion of each blade element 110 is positioned between forked stop pin parts 118 and 120. These are arranged adjacent each side of the blade elements 110.

If desired the pin 114 can be in the form of a screw which is received within threads in the opening 116. It can be formed with a head to prevent radial displacement of the blade elements 110.

The pin parts 118 and 120 are rotatably received within the radial openings 122 in hub 84. Corresponding pin parts can be carried by the reactor shroud 125.

The radially outward margin of the blade elements 110 is covered by aligned, annular, inner shroud extensions 126 and 128 formed, respectively, on the inner turbine shroud 54 and the inner impeller shroud 46.

In FIGURES 4a, 4b, 4c and 4d I have illustrated in graphic form vectors for particles of fluid in various stages of the torus circuit including the entrance and exit regions of the stator blade elements 110. They are shown for the flow conditions that exist during stall, during operation with speed ratio of .5, during operation with a speed ratio of .7 and during operation at the coupling point.

Figure 4B:
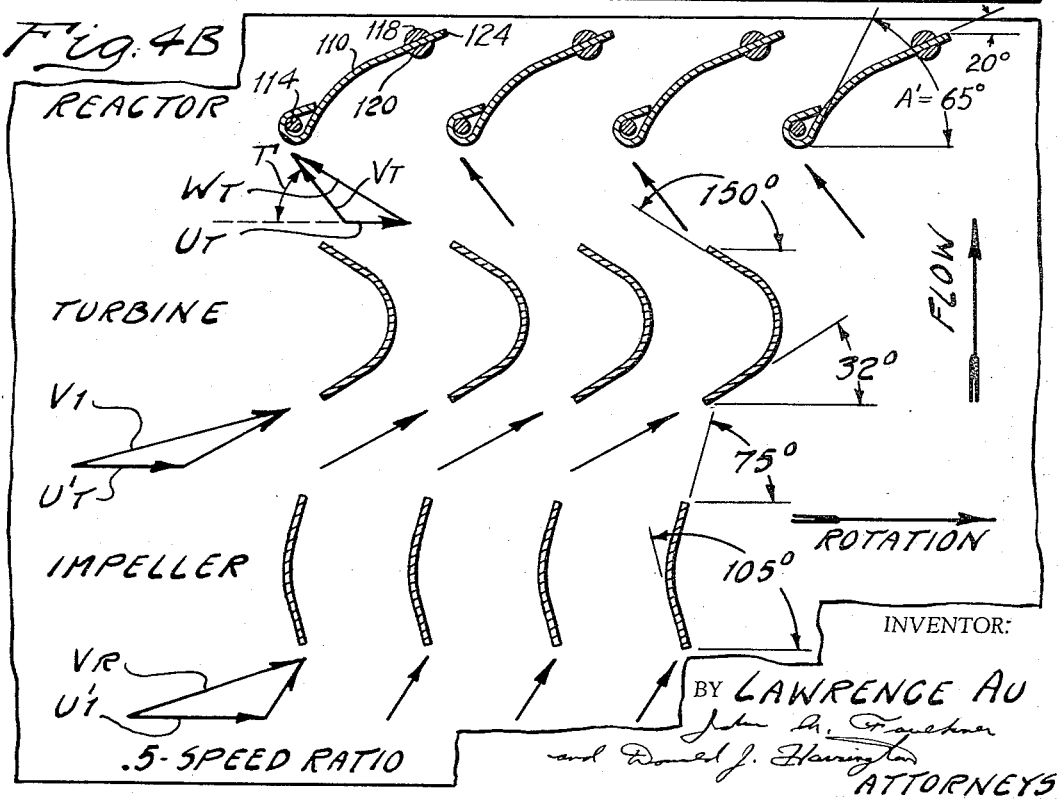
Figure 4C:
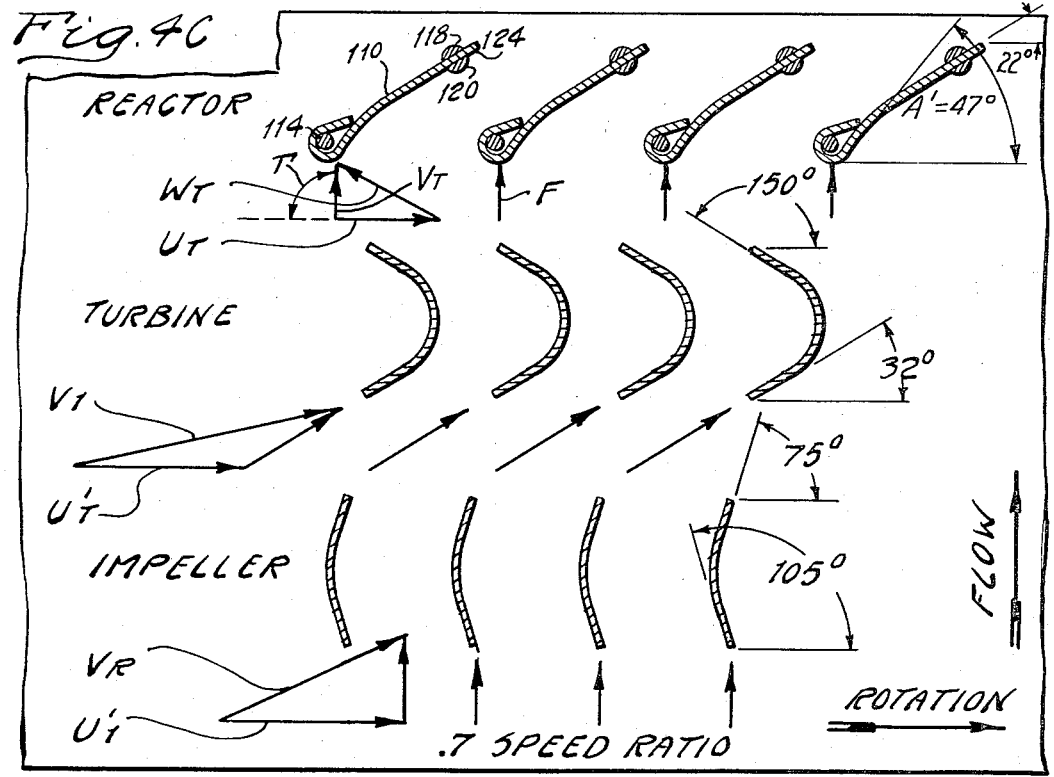

As seen best in FIGURES 4a and 4c, the toroidal fluid flow velocity vectors are represented by the symbol F. The absolute fluid flow velocity vector $V_t$ is the vector sum of the flow vector F and the rotation vector $U_t$ due to the rotation of the turbine. At stall the vector $V_t$ is equal to the vector $W_t$ which is the component of the flow velocity relative to the turbine blades.

As seen from vector diagram 4a, the absolute fluid flow velocity vector $V_t$ approaches the stator blades at a relatively oblique angle. The toroidal fluid flow velocity in the circuit is at a maximum at that time for any given impeller torque. Thus the blade elements 110 tend to flex under the influence of the hydrokinetic forces of the fluid passing through the bladed passages of the stator. This causes the entrance angle A' (FIG. 3) to increase while the exit angle T tends to decrease. This increase in the angle A' can take place because the leading edge 112 is pivotally mounted on the pin 114. Also the pin parts 118 and 120 at the trailing edge portion of the blade elements 110 permit pivoting motion of the blade and also relative sliding motion, thereby allowing blade flexure to occur. After the blade has flexed under the influence of the hydrokinetic forces, the entrance angle becomes more closely aligned with the absolute fluid flow velocity vector $V_t$. This improves the flow conditions and results in improved performance.

The flow vectors at the flow exit section of the stator blades 110 become aligned by reason of the change in the exit angle T in the direction of rotation of the impeller. For any given impeller torque, therefore, the toroidal flow velocity for any given torque can be improved, which in turn results in improved torque ratio.

Figure 4D:
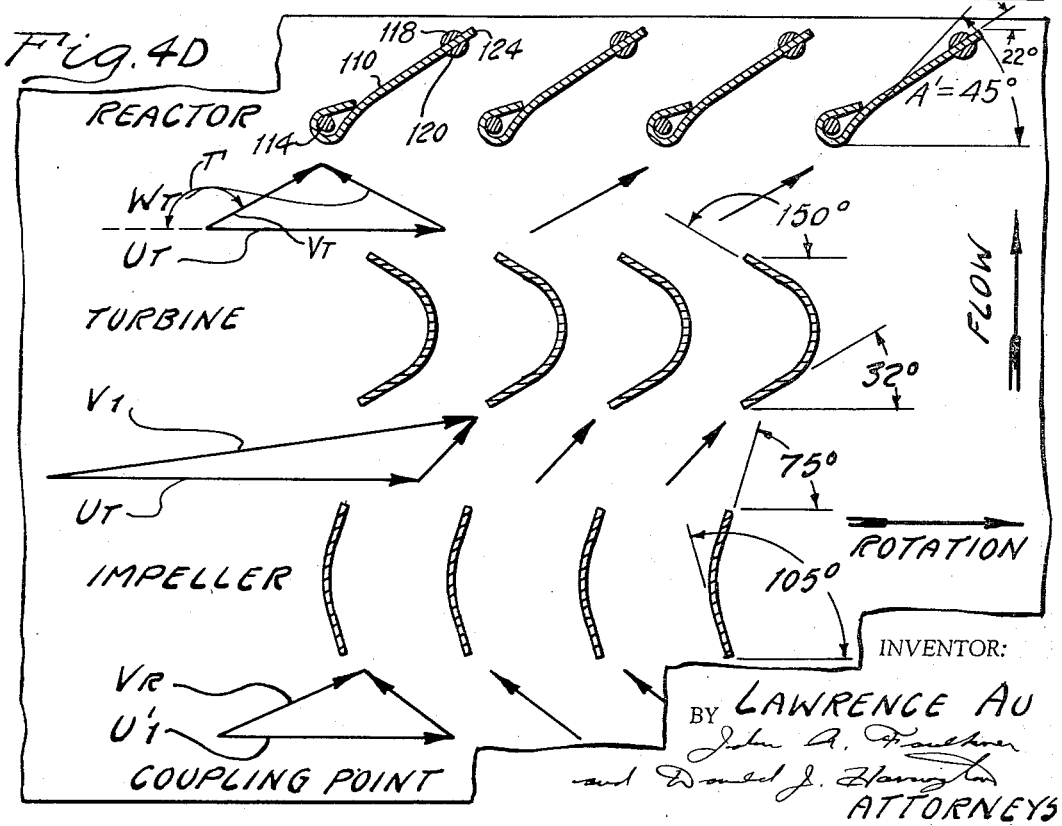

The change in the direction of the flow velocity vectors passing through the bladed passages of the stator is more extreme at stall than at the coupling point. This can be observed by comparing the directions of the velocity vectors $V_t$ and $V_r$ in FIGURE 4a with the corresponding vectors in each of the other FIGURES 4b, 4c and 4d. The hydrokinetic forces acting upon the stator blades during stall is a maximum and the resulting change in the blade geometry due to these hydrokinetic forces tends to compensate for the relatively extreme change in the direction of the vectors during stall. A progressive variation in the blade angle geometry occurs as the speed ratio increases as seen in FIGURES 4b, 4c and 4d. The change in geometry of the stator blades satisfies the performance requirements of the converter to provide an augmentation in torque ratio during operation in the speed range without sacrificing operating efficiency in the high speed ratio range. It is possible, therefore, to achieve a blade geometry that satisfies the design requirements of the converter regardless of changes in the torque applied to the impeller and regardless of changes in speed ratio. During operation of the converter at high speed ratio and at the coupling point, the stator blades are relatively straight. That is, the angles A' and T are substantially equal. During operation at relatively low speed ratios, however, angle A' becomes a maximum and angle T becomes a minimum. The intermediate section of the blades deflects to provide a continuously variable, directional control for the flow velocity vectors. The pin parts 118 and 120 will permit relative sliding motion of the trailing edge portion of the blades as the central section of the blades deforms in this fashion. Thus each blade functions as a flexible end supported beam that is uniformly loaded, the magnitude of the load being dependent upon the impeller torque and the speed ratio. Neither the pins 114 nor the pin parts 118 and 120 provide a rigid restraint to the blades.

Having thus described a preferred form of my invention, what I claim and desire to secure by use of U.S. Letters Patent is:

1. A hydrokinetic torque converter mechanism comprising a bladed impeller, a bladed turbine and a bladed stator situated in toroidal fluid-flow relationship, said stator comprising a stator hub, and a plurality of stator blades situated between the flow exit section of said turbine and the flow entrance section of said impeller, each of said blades comprising a yieldable flow directing element and pivot members carried by said hub, the leading edge portion of each blade being secured to one of said pivot members and the trailing edge portion thereof being pivotally connected to a companion pivot member whereby said blade elements are adapted to deflect under the influence of hydrokinetic forces acting thereon thus providing a continuously variable flow entrance angle and flow exit angle for the stator blade.

2. The combination as set forth in claim 1 wherein one of said pivot members slidably engages said blade, one edge of said blade being hinged to said other pivot member.

3. The combination as set forth in claim 2 wherein the leading edge portion of said blade is hinged to said other member and said one pivot member slidably engages the trailing edge portion of said blade to provide a force reaction point as said other member provides a hinged restraint.

4. The combination as set forth in claim 1 wherein the leading edge portion of each of said blades is deformed about said other reaction member to provide a relatively blunt flow entrance edge for each of said blades, said other member being in the form of a pin extending radially outwardly from said hub.

5. The combination as set forth in claim 2 wherein the leading edge portion of each of said blades is deformed about said other reaction member to provide a relatively blunt flow entrance edge for each of said blades, said other member being in the form of a pin extending radially outwardly from said hub.

6. The combination as set forth in claim 3 wherein the leading edge portion of each of said blades is deformed about said other reaction member to provide a relatively blunt flow entrance edge for each of said blades, said other member being in the form of a pin extending radially outwardly from said hub.

References Cited

UNITED STATES PATENTS

| | | | |
|---|---|---|---|
| 2,168,862 | 8/1939 | DeLavaud | 60—54 |
| 2,562,463 | 7/1951 | Jandasek | 60—54 |
| 2,737,061 | 3/1956 | Kelley | 60—54 |
| 2,924,941 | 2/1960 | Snoy | 60—54 |
| 3,014,430 | 12/1961 | Schneider | 60—54 |

EDGAR W. GEOGHEGAN, *Primary Examiner.*